United States Patent
Avlani et al.

(10) Patent No.: US 12,405,970 B2
(45) Date of Patent: Sep. 2, 2025

(54) MULTI-LAYER APPROACH TO IMPROVING GENERATION OF FIELD EXTRACTION MODELS

(71) Applicant: INTERNATIONAL BUSINESS MACHINES CORPORATION, Armonk, NY (US)

(72) Inventors: Shalin Avlani, San Jose, CA (US); Rajesh M. Desai, San Jose, CA (US); Mayank Vipin Shah, San Jose, CA (US); Xiaoying Gao, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/482,671

(22) Filed: Oct. 6, 2023

(65) Prior Publication Data

US 2025/0117405 A1    Apr. 10, 2025

(51) Int. Cl.
*G06F 16/24*    (2019.01)
*G06F 16/2457*    (2019.01)
*G06F 16/28*    (2019.01)

(52) U.S. Cl.
CPC ...... *G06F 16/285* (2019.01); *G06F 16/24573* (2019.01)

(58) Field of Classification Search
CPC .................. G06F 16/285; G06F 16/24573
See application file for complete search history.

(56) References Cited

U.S. PATENT DOCUMENTS

| | | | |
|---|---|---|---|
| 8,620,842 B1 * | 12/2013 | Cormack | G06F 16/93 706/12 |
| 10,657,158 B2 | 5/2020 | Sheng et al. | |
| 10,747,994 B2 | 8/2020 | Sridharan | |
| 11,087,077 B2 | 8/2021 | Wheaton et al. | |

(Continued)

FOREIGN PATENT DOCUMENTS

| | | |
|---|---|---|
| CN | 102567711 A | 7/2012 |
| CN | 108108387 B | 8/2021 |

OTHER PUBLICATIONS

"A Method to Intelligently Recognize, Interact and Fulfill Business Requests in Emails" [online] IP.com Prior Art Database, Technical Disclosure No. IPCOM000253683D, Apr. 23, 2018, 12 pg.

(Continued)

*Primary Examiner* — Merilyn P Nguyen
(74) *Attorney, Agent, or Firm* — Harrity & Harrity, LLP (57) ABSTRACT

A computer-implemented process for generating cluster templates used for creating extraction models includes the following operations. A plurality of training files associated with a selected class are received. An automated visual analysis is performed on each of the plurality of training files. An automated contextual analysis is performed on each of the plurality of training files. A first clustering of the plurality of training files into a first plurality of clusters using results from the automated visual analysis is performed. A second clustering of one of the plurality of clusters into a second plurality of clusters is performed using results from the automated contextual analysis. Cluster templates for the first and second plurality of clusters are generated.

20 Claims, 9 Drawing Sheets

(56) References Cited

U.S. PATENT DOCUMENTS

| | | | |
|---|---|---|---|
| 11,514,238 B2 | 11/2022 | Begun et al. | |
| 11,514,489 B2 | 11/2022 | Jiang et al. | |
| 2008/0219495 A1* | 9/2008 | Hulten | G06F 16/583 382/100 |
| 2016/0359740 A1* | 12/2016 | Parandehgheibi | H04L 69/16 |
| 2018/0067910 A1* | 3/2018 | Alonso | G06F 16/36 |
| 2019/0188312 A1* | 6/2019 | Pandit | G06F 21/6245 |
| 2019/0205195 A1* | 7/2019 | Tee | G06F 16/285 |
| 2020/0334486 A1* | 10/2020 | Joseph | G06T 5/20 |
| 2020/0401935 A1* | 12/2020 | Malhotra | G06N 5/04 |
| 2021/0081613 A1 | 3/2021 | Begun et al. | |
| 2021/0200937 A1* | 7/2021 | Wheaton | G06F 40/284 |
| 2022/0215446 A1 | 7/2022 | Jiang et al. | |
| 2024/0232539 A1* | 7/2024 | Venkateshwaran | G06N 3/044 |

OTHER PUBLICATIONS

"System and Method for Generatively Extracting Pertinent Structured Information from Documents using Contextual Information," [online] IP.com Prior Art Database, Technical Disclosure No. IPCOM000269025D, Mar. 16, 2022, 7 pg.

"Contract Information Extraction Based on Knowledge Graph," [online] IP.com Prior Art Database, Technical Disclosure No. IPCOM000267254D, Oct. 11, 2021, 4 pg.

"System and Method for Extracting the Business Objects Utilizing Optical Region Recognition (ORR)," [online] IP.com Prior Art Database, Technical Disclosure No. IPCOM000266133D, Jun. 16, 2021, 8 pg.

Nakai, T. et al., "Accuracy improvement and objective evaluation of annotation extraction from printed documents," In The Eighth IAPR International Workshop on Document Analysis Systems, Sep. 16, 2008 (pp. 329-336). IEEE.

Narasimhan K, Yala A, Barzilay R. Improving information extraction by acquiring external evidence with reinforcement learning. arXiv preprint arXiv: 1603.07954. Mar. 25, 2016.

Skalický M, Šimsa Š, Uřičář M, šulc M. Business Document Information Extraction: Towards Practical Benchmarks. InInternational Conference of the Cross-Language Evaluation Forum for European Languages Aug. 25, 2022 (pp. 105-117). Cham: Springer International Publishing.

Grace Period Disclosure: "IBM Automation Document Processing," [online] IBM.com, Automation Document Processing for ICP4BA, Jun. 30, 2023, [retrieved Aug. 28, 2023], retrieved from the Internet: <https://www.ibm.com/products/document-processing>, 8 pg.

Mell, P. et al., The NIST Definition of Cloud Computing, National Institute of Standards and Technology, U.S. Dept. of Commerce, Special Publication 800-145, Sep. 2011, 7 pg.

\* cited by examiner

FORMS

MULTI-LAYER APPROACH TO IMPROVING GENERATION OF FIELD EXTRACTION MODELS

STATEMENT REGARDING PRIOR DISCLOSURES BY THE INVENTOR OR A JOINT INVENTOR

The following disclosure is submitted under 35 U.S.C. 102(b)(1)(A):
DISCLOSURE: "IBM Automation Document Processing," Automation Document Processing for ICP4BA," 2023 Jun. 30.

BACKGROUND

The present invention relates to electronic document processing, and more specifically, to using generating field extraction templates for use in data extraction during the processing of electronic documents.

Form data extraction is a known technology in which data is extracted from fields in documents. Oftentimes, an enterprise may require data to be extracted from a great number of forms that cannot be done manually. Consequently, technology has been created that includes tools and algorithms to automate the process. The collection of data from a single type of document with a known format is a straight-forward process. In this instance, a form extraction model can be used by a computer to extract data from certain locations in a form since the format is known.

However, in many instances, documents of the same type can be formatted differently. For example, the W2 form that is used to report income may vary from company to company and/or from state to state depending upon the reporting requirements. As another example, the electric bills provided by an electricity provider may vary from provider to provider. In these instances, a single form extraction model cannot be used for each of these different documents of the same type. While it is possible to generate form extraction models for each of these different documents of the same type, this process can be cumbersome and time-inefficient.

SUMMARY

A computer-implemented process for generating cluster templates used for creating extraction models includes the following operations. A plurality of training files associated with a selected class are received. An automated visual analysis is performed on each of the plurality of training files. An automated contextual analysis is performed on each of the plurality of training files. A first clustering of the plurality of training files into a first plurality of clusters using results from the automated visual analysis is performed. A second clustering of one of the plurality of clusters into a second plurality of clusters is performed using results from the automated contextual analysis. Cluster templates for the first and second plurality of clusters are generated.

In other aspects, the process includes receiving annotations for a first training file within a particular one of the first and second plurality of clusters, and the annotations are automatically propagated to each of a plurality of other training files within the particular one of the first and second plurality of clusters. A cluster annotation template is generated for the particular one of the first and second plurality of clusters using the annotations. Also, an instruction to modify the annotations is received from the user, and the cluster annotation template is modified based upon the instruction. Field extraction models are generated for each of the first and second plurality of clusters using the cluster templates and cluster annotation templates. Additionally, the automated visual analysis can include generating an image hash for each of the plurality of training files, and extracting structural information for each of the plurality of training files. The image hash can include generating a shingle, and the automated contextual analysis includes generating a Term Frequency-Inverse Document Frequency vector for each of the plurality of training files. Additionally, the process can include receiving a document for data extraction; identifying a classification of the document; selecting a field extraction model based upon the classification; and extracting data from the document using the field extraction model.

A computer hardware system for generating cluster templates used for creating extraction models includes a hardware processor configured to perform the following executable operations. A plurality of training files associated with a selected class are received. An automated visual analysis is performed on each of the plurality of training files. An automated contextual analysis is performed on each of the plurality of training files. A first clustering of the plurality of training files into a first plurality of clusters using results from the automated visual analysis is performed. A second clustering of one of the plurality of clusters into a second plurality of clusters is performed using results from the automated contextual analysis. Cluster templates for the first and second plurality of clusters are generated.

In other aspects, the system includes receiving annotations for a first training file within a particular one of the first and second plurality of clusters, and the annotations are automatically propagated to each of a plurality of other training files within the particular one of the first and second plurality of clusters. A cluster annotation template is generated for the particular one of the first and second plurality of clusters using the annotations. Also, an instruction to modify the annotations is received from the user, and the cluster annotation template is modified based upon the instruction. Field extraction models are generated for each of the first and second plurality of clusters using the cluster templates and cluster annotation templates. Additionally, the automated visual analysis can include generating an image hash for each of the plurality of training files, and extracting structural information for each of the plurality of training files. The image hash can include generating a shingle, and the automated contextual analysis includes generating a Term Frequency-Inverse Document Frequency vector for each of the plurality of training files. Additionally, the process can include receiving a document for data extraction; identifying a classification of the document; selecting a field extraction model based upon the classification; and extracting data from the document using the field extraction model.

A computer program product includes a computer readable storage medium having stored therein program code for generating cluster templates used for creating extraction models. The program code, which when executed by a computer hardware system, cause the computer hardware system to perform the following. A plurality of training files associated with a selected class are received. An automated visual analysis is performed on each of the plurality of training files. An automated contextual analysis is performed on each of the plurality of training files. A first clustering of the plurality of training files into a first plurality of clusters using results from the automated visual analysis is performed. A second clustering of one of the plurality of clusters into a second plurality of clusters is performed using results from the automated contextual analysis. Cluster templates for the first and second plurality of clusters are generated.

In other aspects, the computer program product includes receiving annotations for a first training file within a particular one of the first and second plurality of clusters, and the annotations are automatically propagated to each of a plurality of other training files within the particular one of the first and second plurality of clusters. A cluster annotation template is generated for the particular one of the first and second plurality of clusters using the annotations. Also, an instruction to modify the annotations is received from the user, and the cluster annotation template is modified based upon the instruction. Field extraction models are generated for each of the first and second plurality of clusters using the cluster templates and cluster annotation templates. Additionally, the automated visual analysis can include generating an image hash for each of the plurality of training files, and extracting structural information for each of the plurality of training files. The image hash can include generating a shingle, and the automated contextual analysis includes generating a Term Frequency-Inverse Document Frequency vector for each of the plurality of training files. Additionally, the process can include receiving a document for data extraction; identifying a classification of the document; selecting a field extraction model based upon the classification; and extracting data from the document using the field extraction model.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1A:
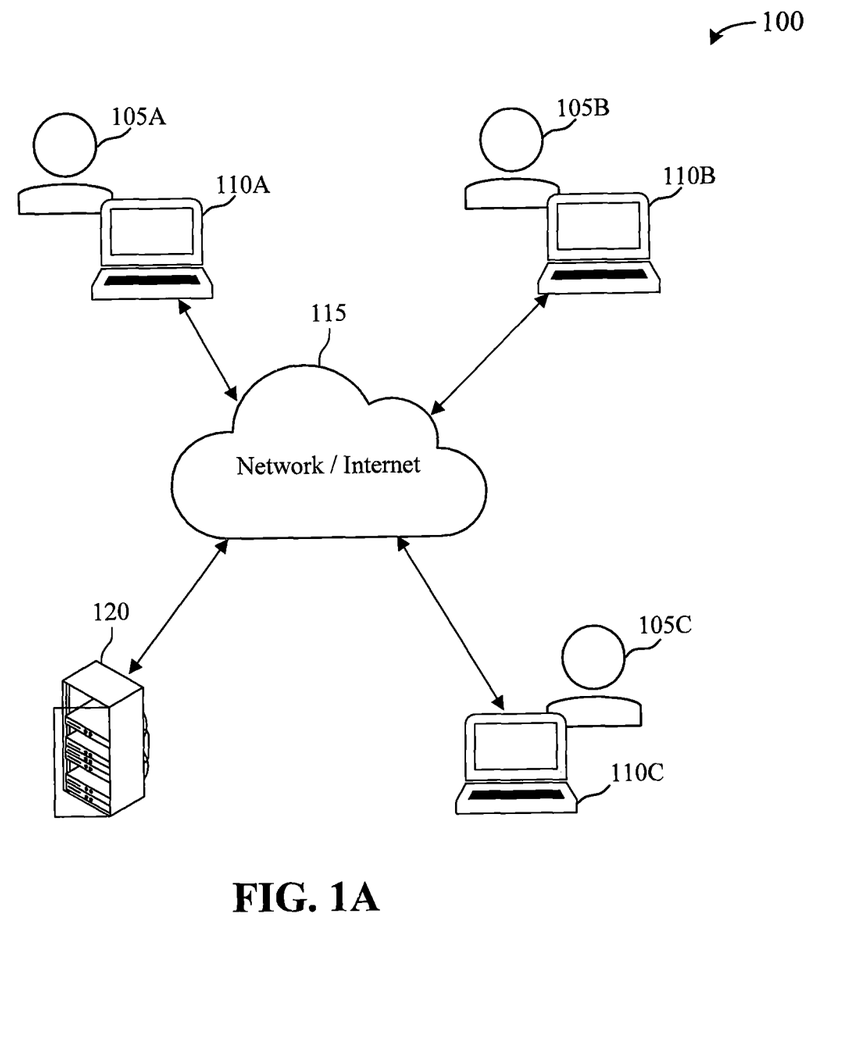
FIGS. 1A-B are block diagrams of a field extraction system according to an aspect of the present invention.

Reference is made to FIGS. 1A-B, 2 and 4-5, which respectively illustrate an architecture 100 and methodology 200, 400, and 500 for generating cluster templates 147 and field extraction models 157 for use in the automated processing of electronic documents 159. Referring to FIG. 1A, a plurality of users 105A-C on client devices 110A-C can interact with a field extraction system 120 via a network/ internet 115. Although not limited in this manner, the field extraction system 120 is configured to perform the following operations. A plurality of training files 125 associated with a selected class are received by the field extraction system. A document classification trainer 140 is configured to perform an automated visual analysis on each of the plurality of training files 125. An automated contextual analysis is performed on each of the plurality of training files, and a template clustering engine 145 is configured to perform a first clustering of the plurality of training files 125 into a first plurality of clusters using results from the automated visual analysis. A second clustering of one of the plurality of clusters into a second plurality of clusters is performed using results from the automated contextual analysis. Cluster templates 147 for the first and second plurality of clusters are then generated.

Figure 1B:
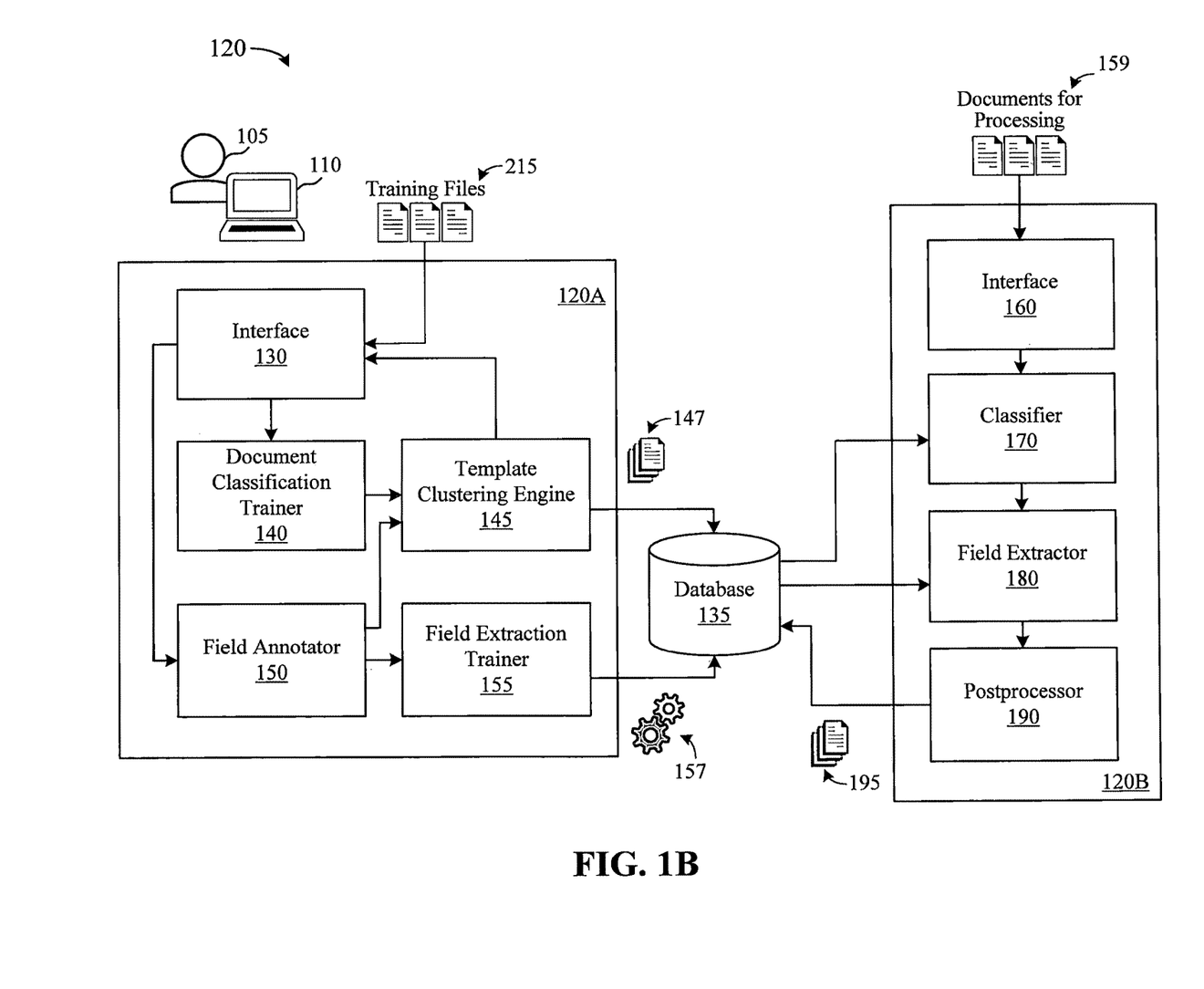

Although illustrated as a singular entity in FIG. 1A, the field extraction system 120 is not limited in this manner. With reference to FIG. 1B, the field extraction system 120 can be comprised of multiple components 120A, 120B, with each component 120A, 120B containing certain functional aspects of the field extraction system 120. Although two components 120A, 120B are illustrated, the field extraction system 120 is not limited in this manner. For example and as described further described with reference to FIG. 7, some or all of the functional aspects of the field extraction system 120 can be distributed in the cloud. Additionally, while a single database 135 is illustrated, the database 135 can be also distributed in the individual components 120A, 120B and/or within the cloud.

Figure 2:
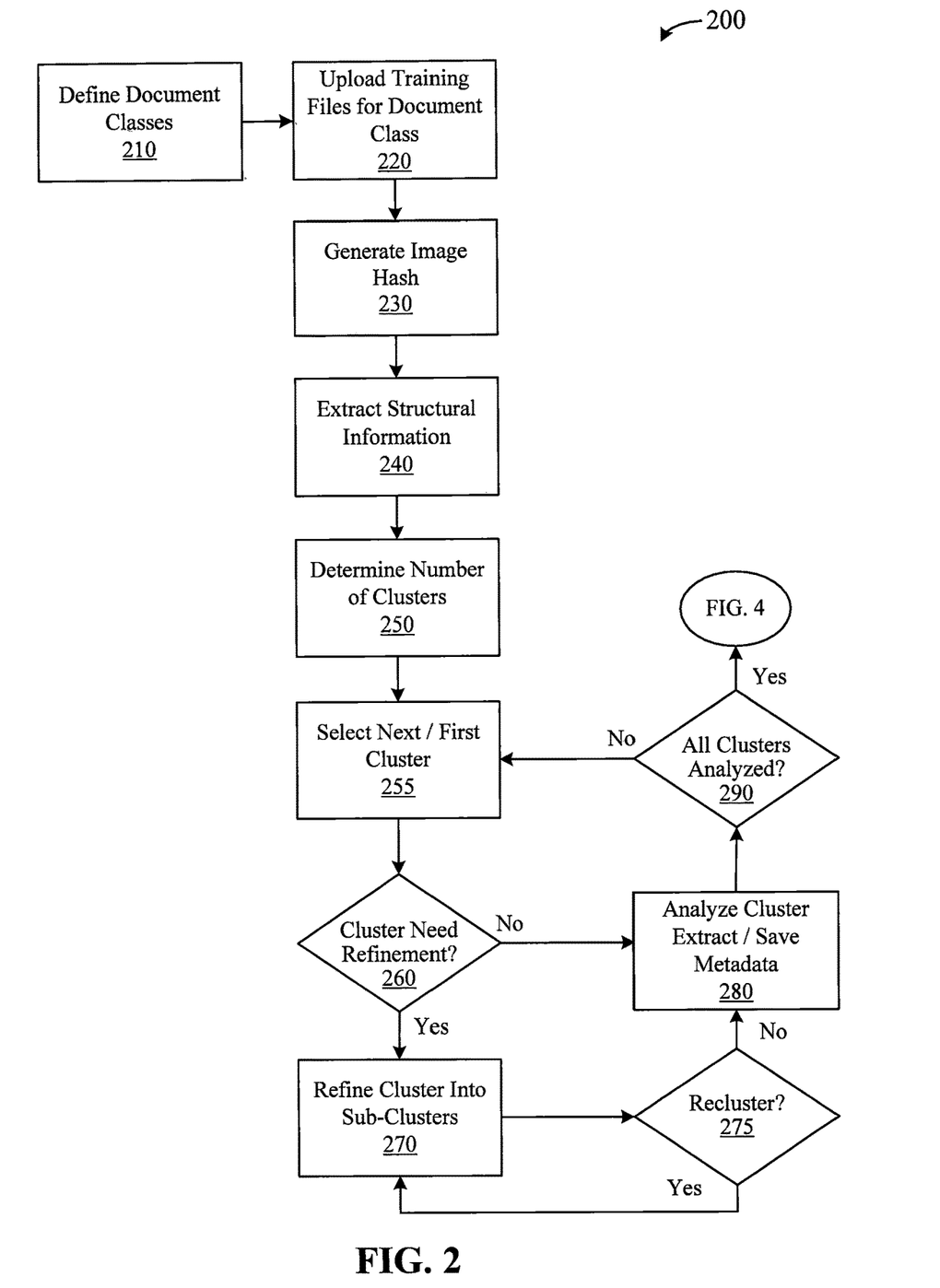
FIG. 2 is a block diagram illustrating an example method for generating template clusters using the architecture of FIGS. 1A-B according to an aspect of the present invention.

FIG. 2 illustrates a two-stage methodology/process 200 for generating cluster templates 147 that are each associated with an individual cluster 305 of the documents within the plurality of training files 125. In 210, a document class to be associated with the cluster templates 147 is defined. The document class reflects the type of information to be retrieved from a document. For example, a mortgage company may require income information as part of a loan underwriting process. In this instance, the type of information needed may include income, assets, and debts. As another example, a solar panel installation company may need energy usage information in order to properly determine the size of a solar panel installation for a home. In this instance, information needed may include energy usage (e.g., KWh) and an address associated with the energy usage. Although not limited in this manner, the document class can be defined by a user 105 interacting with the field extraction system 120 using a client device 110.

In 220, a plurality of training files 125 associated with the defined document class is uploaded into the field extraction system 120 via, for example, the interface 130. The plurality of training files 125 is not limited as to a particular source. For example, the plurality of training files 125 could be provided by the client device 110, can be loaded from a source external to the field extraction system 120, and/or be provided by a database 135 associated with the field extraction system 120. For example, the aforementioned solar panel installation company may use, as the plurality of training files 125, various different electric bills. As another example, the aforementioned tax company may use, as the plurality of training files 125, different tax documents.

In 230, an image hash is generated for each of the training files within the plurality of training files 125. Techniques for generating an image hash are well-known, and the field extraction system 120 is not limited as to a particular approach. For example, MP5 is a known approach for generating an image hash. However, in certain aspects, a document hash of the image of a training file is generated using a shingle algorithm. A shingle algorithm has a benefit of providing similar values when two similar images are being compared. Consequently, this algorithm can be used to determine how close two images are to one another.

In 240, structural information is extracted from each document in the plurality of training files 125. Although not limited in this manner, structural information includes number of pages, page size, number of tables, number of paragraphs, number of links, and number of words. As used here, the term "structural information" includes information that is not "contextual information," and "contextual information" is information associated with a meaning of the words contained within a particular document.

In 250, the template clustering engine 145 determines, for the plurality of training files 125, a number N of clusters and assigns each file within the plurality of training files 125 to a particular cluster and associated cluster template. The N number of clusters can be determined automatically or can be provided by the user 105 via the client device 110 as a seed value. There are many types of techniques that can be used to cluster documents into clusters, and the template clustering engine 145 is not limited as to a particular approach. However, in certain aspects, the template cluster engine 145 generates a dendrogram (e.g., hierarchical tree structure) with the leaf nodes corresponding to the individual documents. Notably, this approach can be performed more efficiently as opposed to other approaches.

Figure 3A:
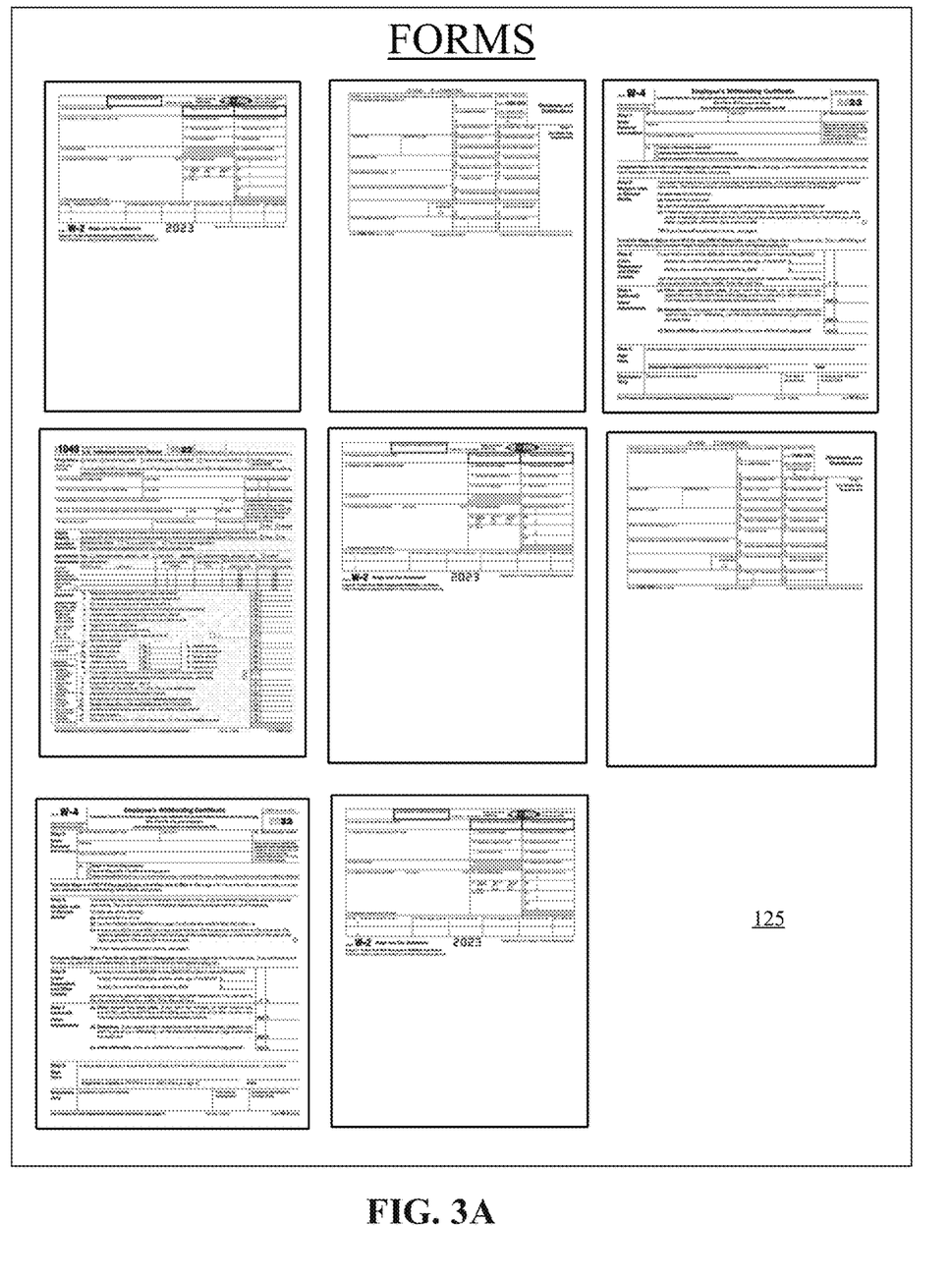
FIGS. 3A-B illustrate the clustering of documents according to aspects of the present invention.
Figure 3B:
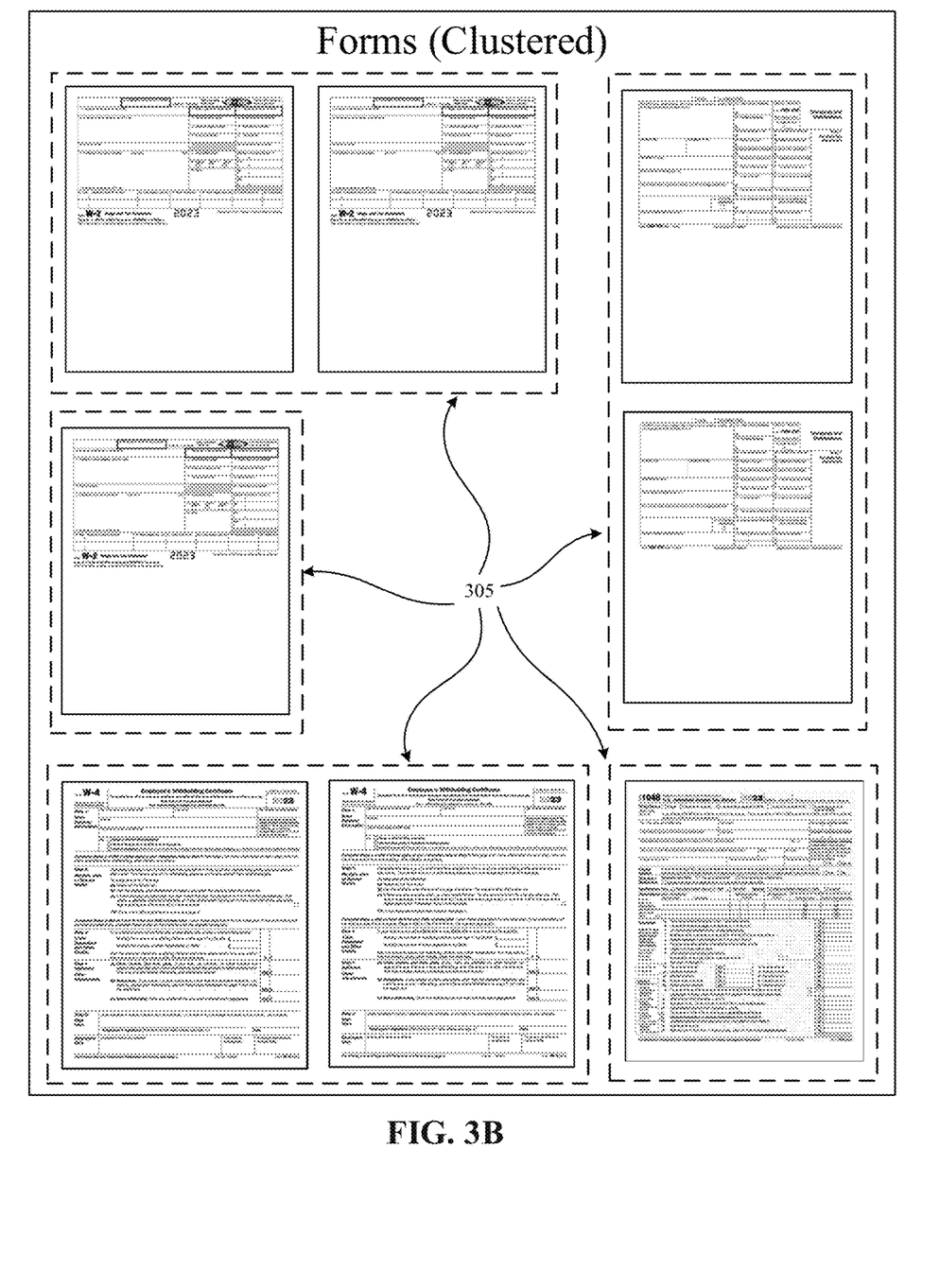

Once the N number of clusters have been identified, the files within the plurality of training files 125 are assigned to a particular one of the clusters (i.e., the documents are clustered together). Although not limited in this manner, the clustering of the documents includes generating a distance matrix using the previously-obtained image hash and structural information for each particular file within the plurality of training files 125. An example of clustering is illustrated in FIGS. 3A-B. FIG. 3A represents the plurality of training files 125 (e.g., forms) prior to clustering, and FIG. 3A represents the plurality of training files 125 that have been clustered into five different clusters 305.

In 255, a first (or next) cluster 305 in the group of clusters is identified for analysis. Next, in 260, an automated determination is made as to whether the files/documents within a particular selected cluster 305 are, in fact, properly clustered. For example, while two files may look visually similar, the two files may, in fact, be different. In certain aspects, this determination is performed by generating TF-IDF (Term Frequency-Inverse Document Frequency) vector for each file in the cluster 305. The TF-IDF is context-sensitive, as opposed to the visual hash and structural information, which are not context-sensitive. If the TF-IDF vectors for all of the documents within a particular cluster 305 are within a predefined value, then a determination can be made that the files within the cluster 305 have been properly clustered and does not require refinement. In addition to or alternatively from the automated determination, the cluster 305 can be manually reviewed (e.g., by the user 105). If the cluster 305 does not require refine, the process 200 proceeds to 290. Otherwise, the process 200 moves to operation 270.

If, in 260, a determination that a context-based measure reveals that the files within the cluster 305 are not properly clustered using the image hash and the structural information, then in 270, the files within the cluster can be further clustered into additional clusters using a context-based measure along with the image hash and the structural information. In 275, after new child clusters have been generated within the parent cluster 305, these child clusters can be (optionally) manually reviewed (e.g., by the user 105). If a manual review of the child clusters determines that the child clusters have been inaccurately created (or otherwise not acceptable), then the process 200 can return to operation 270 to perform a re-clustering of the files within the parent cluster 305.

In 280, once a determination is made that the particular cluster 305 has been properly generated (i.e., either in 260 or 275), a cluster template 147 associated with the particular cluster 305 can be generated and subsequently stored, for example, in the database 135. Although not limited in this manner, the cluster template includes metadata such as: a template ID that identifies that particular cluster template along with metadata that can be used to classify a particular file into the cluster. For example, the metadata can include, for example, an image hash value (or range of image hash values), structural information, and/or value (or range of values) associated with the context information associated with the image cluster (e.g., the TF-IDF vector). Information that specifies the particular document class covered by the cluster template 147 can also be included in a cluster template 147.

In 290, after the cluster template 147 has been generated/stored, a determination is made whether all of the clusters 305 have been analyzed. If not, in 285, the process 200 returns to operation 255. If yes, the process 200 ends and then can proceed to the process 400 illustrated in FIG. 4.

Figure 4:
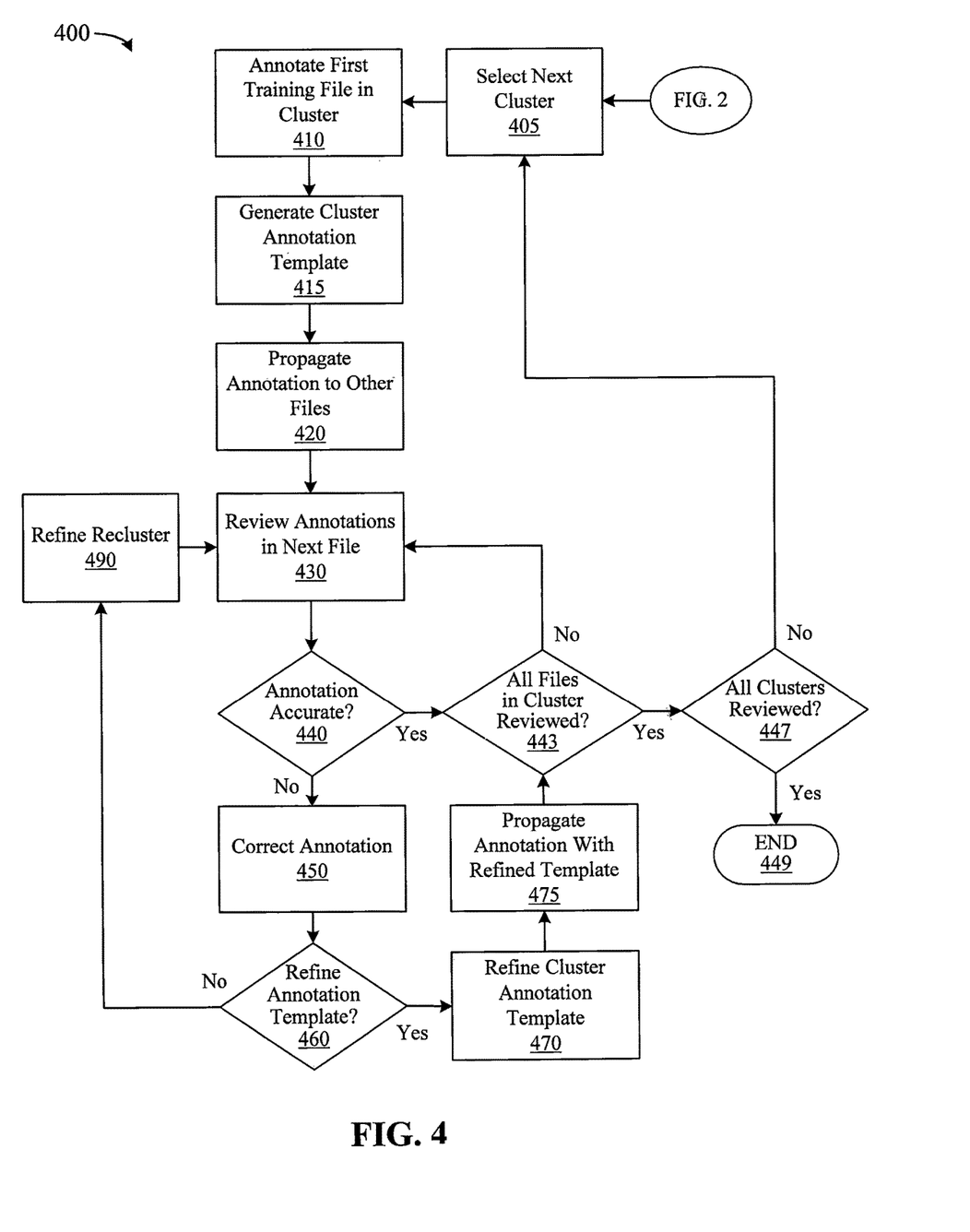
FIG. 4 is a block diagram illustrating an example method for generating cluster annotation templates using the architecture of FIGS. 1A-B according to aspects of the present invention.

Referring to FIG. 4, once the multi-layer template clustering process 200 of FIG. 2 has been performed and the cluster templates 147 have been generated and stored, a field annotation process 400 is performed for each identified cluster 305. In 405, a first (or next) cluster 305 is identified from the plurality of clusters generated during the process of FIG. 2.

In 410, a first training file within the identified cluster 305 is annotated to identify information to be extracted from the first training file. The processing of annotation training files is known, and the field annotator 150 is not limited as to any particular approach so capable. Typically, these approaches include visually presenting the training file to the user 105 via the client device 110 and receiving, via the client device 110, a bounding box(es) that encompass one or more areas in the training file that contain the information to be extracted. These bounding boxes are computer data structures that will then be associated with the particular training file. In certain instances, the training file being visually presented to the user 105 via the client device 110 can already include annotations. If so, the user can choose, via the client device 110, to either accept or reject these already-included annotations.

In 415, once the one or more annotations have been generated/approved for the first training file within the identified cluster 305, the field annotator 150 is configured to generate a cluster annotation template that is specific to the identified cluster 305. Specifically, the cluster annotation template describes how the one or more annotations generated/approved for the first training file can be applied to other training files within the identified cluster 305.

In 420, the annotations to the first training file are propagated to the other training files in the same cluster 305 as the first training file. This can be performed, for example, by automatically applying, using the field annotator 150, the cluster annotation template to each of the other training files in the cluster 305.

In 430, once the annotations have been propagated to the other training files in the cluster 305, the user 105 can then review each of the other training files to determine whether the propagated annotations are accurate. In 440, if the annotations (e.g., the bounding box(es)) are accurate, the process 400 proceeds to 443, to determine if all of the other training files in the particular cluster 305 have been reviewed. If not, the process 400 loops back to continue review of the other training files within the cluster 305.

If, in 443, a determination is made that the annotations for all of the training files in the particular cluster 305 have been reviewed, the process 400 proceeds to 447, which determines whether all clusters have been analyzed. In 447, if the all the clusters 305 have been analyzed, then the process 400 ends in 449. Otherwise, the process returns to 405 to select a next cluster to be analyzed in 410.

If the propagated annotation is not correct, in 450, the user 105 can select to refine the propagated annotation for a particular file within the cluster 305. This process can be the same or similar to the operations performed in 410. Depending upon the amount of changes made, in 460, a manual or automatic determination can be made as to whether to refine the cluster annotation template associated with the cluster 305. For example, if the number and/or extent of the changes are minor, a determination can be made not to modify the annotation. However, if, for example, the changes are substantial, the cluster annotation template associated with the cluster 305 can be modified in 470. The process can then proceed to proceed to 443 to determine if all of the training files in the cluster have been reviewed.

In 480, depending, for example, upon the number of changes needed to be made, a determination can be made as to whether to recluster the training files within the cluster 305. In this instance, for example, the need to correct the propagated annotation may be because the training files in the cluster 305 were not clustered properly. If this determination is made, then then the files can be reclustered in 490. This can include, for example, providing automated feedback that can be used to recluster as in operations 250 or 270.

If, in 460, a determination is made to refine the cluster annotation template, then the cluster annotation template is refined in 470 based upon the refinement of the annotations in 450. Additionally, in 475, the one or more annotations indicated by the revised cluster annotation template can be automatically propagated to other training files within the cluster 305 in a manner similar to that described in 420.

Figure 5:
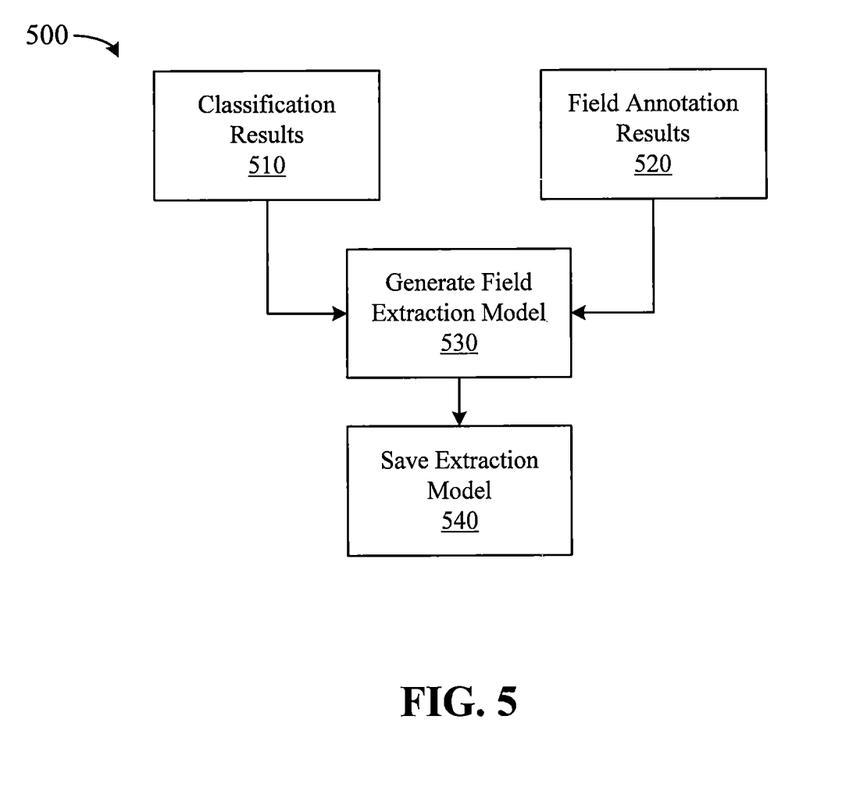
FIG. 5 is a block diagram illustrating an example method for generating field extraction models using the architecture of FIGS. 1A-B according to aspects of the present invention.

Referring to FIG. 5, a process of generating field extraction models 157 is disclosed. Document classification results 510 and field annotation results 520 are fed into the field extraction trainer 155. The classification of documents in 510 is a known process that is able to classify a particular document into a particular document class. The field annotation information includes the specific type of information that is to be extracted from a particular document. Accordingly, the results 510, 520 include template ID, image hash, and the defined field annotation information. In 530, using these results 510, 520, the field extraction trainer 155 generates for each particular cluster template 147 a field extraction model 157 that is specific to the particular cluster template 147. For example, the image hash, when saved as part of the field extraction model 157, can be used to better identify what field extraction model 157 should be used for documents that match the image hash. In 540, the generated field extraction models 157 can be saved into the database 135.

Figure 6:
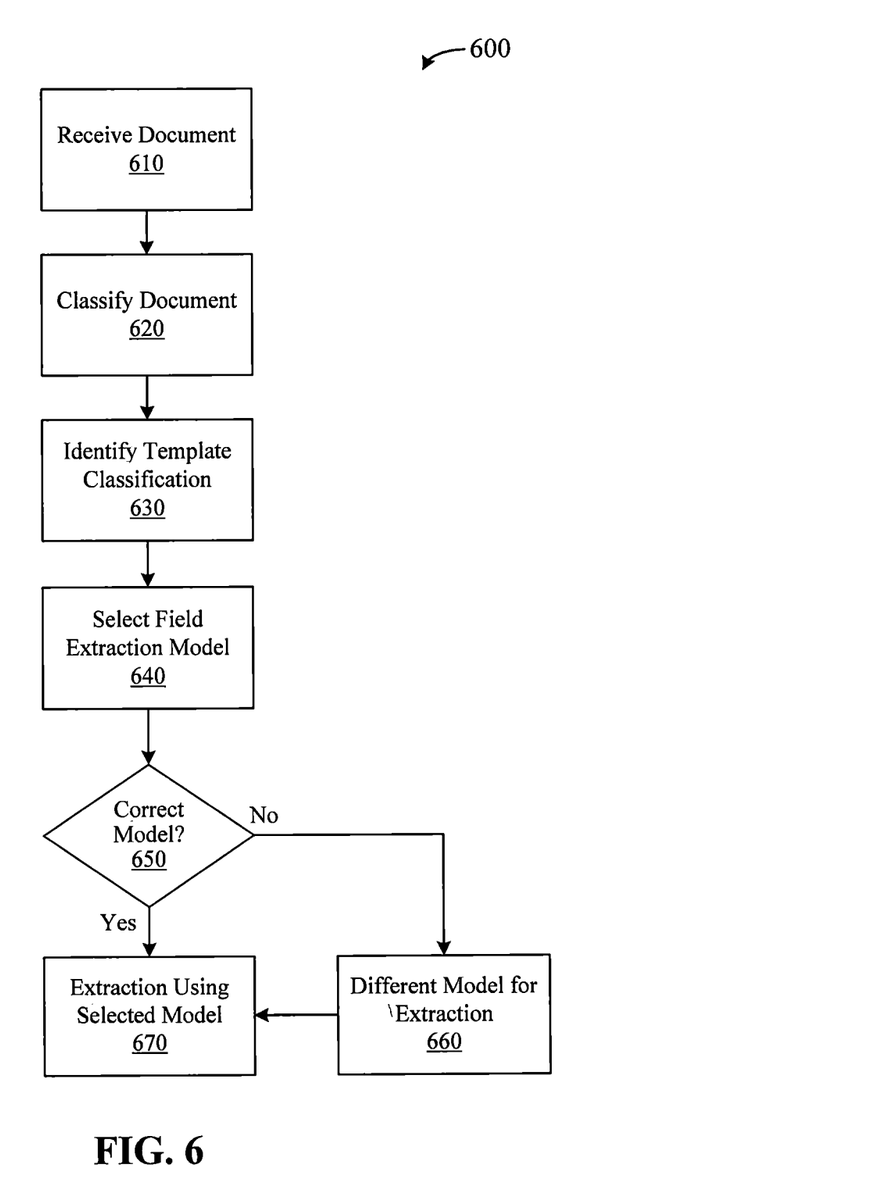
FIG. 6 is a block diagram illustrating an example method for extracting data from documents using the architecture of FIGS. 1A-B according to aspects of the present invention.

Referring to FIG. 6, a process 600 for classifying a particular document 159 is disclosed. In 610, the document 159 is received by an interface 160 of the field extraction system 120. Once the document 159 has been received, a classifier 170 is used to classifying the document into a document type in 620. For example, the classifier 170 may identify the document 159 as a W2 form, a tax form, or an electric bill. Next, in 630 and based upon the document type in 160, the classifier 170 determines a cluster, within the classification, associated with the document 159 based upon information contained within the cluster templates 147.

After the document 159 has been classified and a particular cluster template 147 has been identified for use with the document 159, in 640, a field extraction model 157 can be identified for use with the document 159. The field extraction model 157 can be determined based upon, for example, the template ID, an image hash of the document 159, structural information of the document 159, and/or text within the document 159. For example, an image hash of the document 159 (e.g., using the processing described with reference to operation 230 in FIG. 2) can be generated and that image hash of the document 159 can be compared to image hashes associated with each of the field extraction models 157.

If a correct field extraction model 157 is identified in 670, data 195 is extracted from the document 159 using the field extraction model 157, and that data 195 can be subsequently stored in the database 135. Alternatively, in 660, if an incorrect field extraction model 157 was initially identified in 640, a different field extraction model 157 can be selected to extract data 195 from the document 159.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

Figure 7:
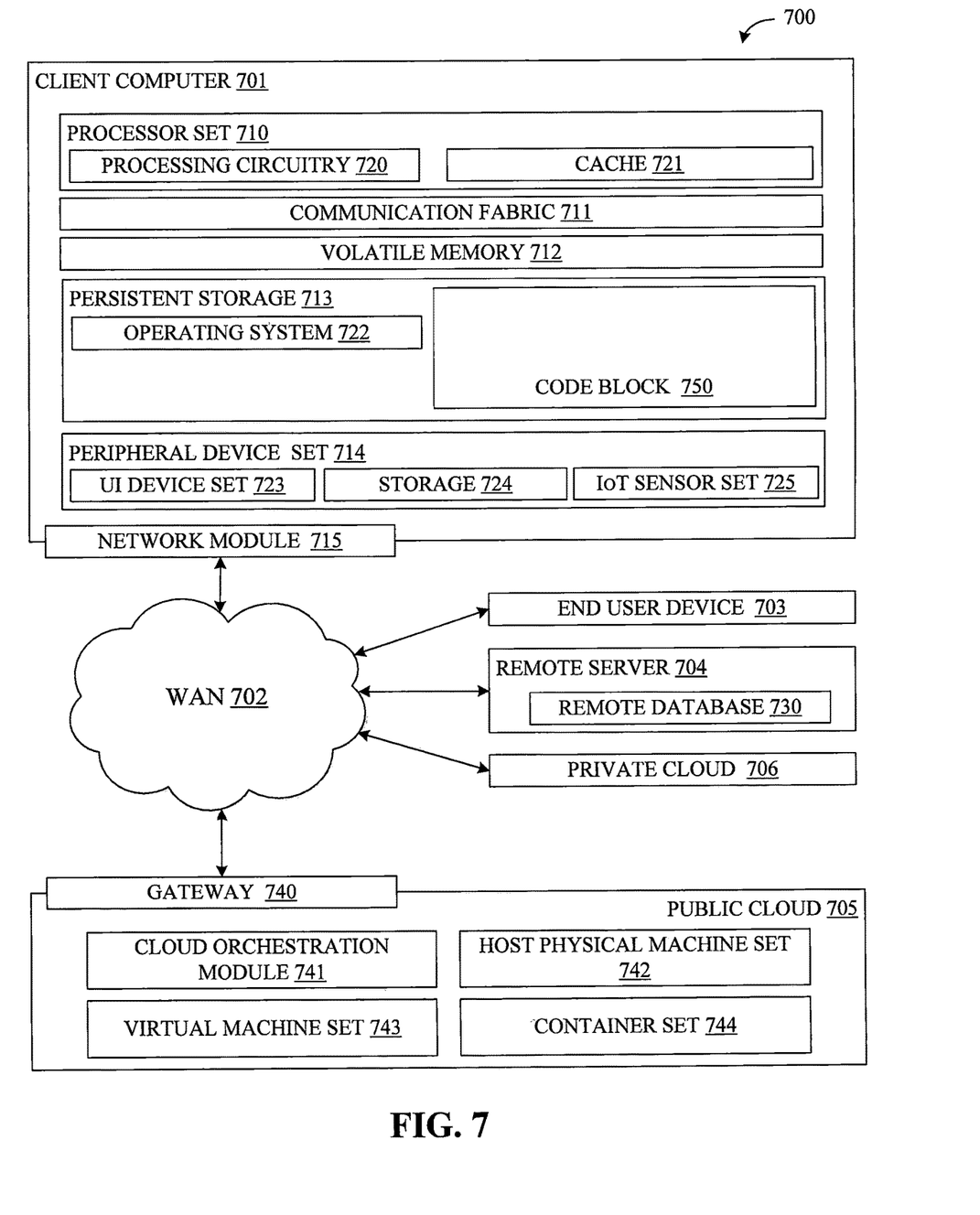
FIG. 7 is a block diagram illustrating an example of computer hardware system for implementing the field extraction system of FIGS. 1A-B.

Referring to FIG. 7, computing environment 700 contains an example of an environment for the execution of at least some of the computer code involved in performing the inventive methods, such as code block 750 for implementing the operations of the field extraction system 120. Computing environment 700 includes, for example, computer 701, wide area network (WAN) 702, end user device (EUD) 703, remote server 704, public cloud 705, and private cloud 706. In certain aspects, computer 701 includes processor set 710 (including processing circuitry 720 and cache 721), communication fabric 711, volatile memory 712, persistent storage 713 (including operating system 722 and method code block 750), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

Computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. However, to simplify this presentation of computing environment 700, detailed discussion is focused on a single computer, specifically computer 701. Computer 701 may or may not be located in a cloud, even though it is not shown in a cloud in FIG. 7 except to any extent as may be affirmatively indicated.

Processor set 710 includes one, or more, computer processors of any type now known or to be developed in the future. As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In certain computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods discussed above in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in code block 750 in persistent storage 713.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible, hardware device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing.

A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Communication fabric 711 is the signal conduction paths that allow the various components of computer 701 to communicate with each other. Typically, this communication fabric 711 is made of switches and electrically conductive paths, such as the switches and electrically conductive paths that make up busses, bridges, physical input/output ports and the like. Other types of signal communication paths may be used for the communication fabric 711, such as fiber optic communication paths and/or wireless communication paths.

Volatile memory 712 is any type of volatile memory now known or to be developed in the future. Examples include dynamic type random access memory (RAM) or static type RAM. Typically, the volatile memory 712 is characterized by random access, but this is not required unless affirmatively indicated. In computer 701, the volatile memory 712 is located in a single package and is internal to computer 701. In addition to alternatively, the volatile memory 712 may be distributed over multiple packages and/or located externally with respect to computer 701.

Persistent storage 713 is any form of non-volatile storage for computers that is now known or to be developed in the future. The non-volatility of the persistent storage 713 means that the stored data is maintained regardless of whether power is being supplied to computer 701 and/or directly to persistent storage 713. Persistent storage 713 may be a read only memory (ROM), but typically at least a portion of the persistent storage 713 allows writing of data, deletion of data and re-writing of data. Some familiar forms of persistent storage 713 include magnetic disks and solid state storage devices. Operating system 722 may take several forms, such as various known proprietary operating systems or open source Portable Operating System Interface type operating systems that employ a kernel. The code included in code block 750 typically includes at least some of the computer code involved in performing the inventive methods.

Peripheral device set 714 includes the set of peripheral devices for computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet.

In various aspects, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some aspects, storage 724 may take the form of a quantum computing storage device for storing data in the form of qubits. In aspects where computer 701 is required to have a large amount of storage (for example, where computer 701 locally stores and manages a large database) then this storage 724 may be provided by peripheral storage devices designed for storing very large amounts of data, such as a storage area network (SAN) that is shared by multiple, geographically distributed computers. Internet-of-Things (IoT) sensor set 725 is made up of sensors that can be used in IoT applications. For example, one sensor may be a thermometer and another sensor may be a motion detector.

Network module 715 is the collection of computer software, hardware, and firmware that allows computer 701 to communicate with other computers through a Wide Area Network (WAN) 702. Network module 715 may include hardware, such as modems or Wi-Fi signal transceivers, software for packetizing and/or de-packetizing data for communication network transmission, and/or web browser software for communicating data over the internet. In certain aspects, network control functions and network forwarding functions of network module 715 are performed on the same physical hardware device. In other aspects (for example, aspects that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any Wide Area Network (for example, the internet) capable of communicating computer data over non-local distances by any technology for communicating computer data, now known or to be developed in the future. In some aspects, the WAN 702 may be replaced and/or supplemented by local area networks (LANs) designed to communicate data between devices located in a local area, such as a Wi-Fi network. The WAN 702 and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In certain aspects, EUD 703 may be a client device, such as thin client, heavy client, mainframe computer, desktop computer and so on.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein. As defined herein, the term "user" means a person (i.e., a human being).

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704. As defined herein, the term "server" means a data processing system configured to share services with one or more other data processing systems.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705.

The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

VCEs can be stored as "images," and a new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other aspects, a private cloud 706 may be disconnected from the internet entirely (e.g., WAN 702) and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this aspect, public cloud 705 and private cloud 706 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

As another example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Each block in the flowchart or block diagrams may represent a module, segment, or portion of instructions, which comprises one or more executable instructions for implementing the specified logical function(s).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "if," "when," "upon," "in response to," and the like are not to be construed as indicating a particular operation is optional. Rather, use of these terms indicate that a particular operation is conditional. For example and by way of a hypothetical, the language of "performing operation A upon B" does not indicate that operation A is optional. Rather, this language indicates that operation A is conditioned upon B occurring.

The foregoing description is just an example of embodiments of the invention, and variations and substitutions. While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented method for generating cluster templates used for creating extraction models, comprising:
   receiving a plurality of training files associated with a selected class;
   performing an automated visual analysis on each of the plurality of training files;
   performing an automated contextual analysis on each of the plurality of training files;
   performing a first clustering of the plurality of training files into a first plurality of clusters using results from the automated visual analysis;

performing a second clustering of one of the first plurality of clusters into a second plurality of clusters using results from the automated contextual analysis; and generating cluster templates for the first and second plurality of clusters, wherein the first and the second plurality of clusters are clusters of the plurality of training files.

2. The method of claim 1, further comprising:

receiving, for a first training file within a particular one of the first and second plurality of clusters, annotations;

automatically propagating the annotations to each of a plurality of other training files within the particular one of the first and second plurality of clusters; and generating a cluster annotation template for the particular one of the first and second plurality of clusters using the annotations.

3. The method of claim 2, further comprising:

receiving, from a user, an instruction to modify the annotations; and modifying the cluster annotation template based upon the instruction.

4. The method of claim 2, further comprising:

generating field extraction models for each of the first and second plurality of clusters using the cluster templates and cluster annotation templates.

5. The method of claim 1, wherein the automated visual analysis includes:

generating an image hash for each of the plurality of training files, and extracting structural information for each of the plurality of training files.

6. The method of claim 5, wherein the image hash includes generating a shingle.

7. The method of claim 1, wherein the automated contextual analysis includes generating a Term Frequency-Inverse Document Frequency vector for each of the plurality of training files.

8. The method of claim 1, further comprising:

receiving a document for data extraction;

identifying a classification of the document;

selecting a field extraction model based upon the classification; and extracting data from the document using the field extraction model.

9. A computer hardware system for generating cluster templates used for creating extraction models, comprising:

a hardware processor configured to perform the following executable operations:

receiving a plurality of training files associated with a selected class;

performing an automated visual analysis on each of the plurality of training files;

performing an automated contextual analysis on each of the plurality of training files;

performing a first clustering of the plurality of training files into a first plurality of clusters using results from the automated visual analysis;

performing a second clustering of one of the first plurality of clusters into a second plurality of clusters using results from the automated contextual analysis; and generating the cluster templates for the first and second plurality of clusters, wherein the first and the second plurality of clusters are clusters of the plurality of training files.

10. The system of claim 9, wherein the hardware processor is further configured to perform the following:

receiving, for a first training file within a particular one of the first and second plurality of clusters, annotations;

automatically propagating the annotations to each of a plurality of other training files within the particular one of the first and second plurality of clusters; and generating a cluster annotation template for the particular one of the first and second plurality of clusters using the annotations.

11. The system of claim 10, wherein the hardware processor is further configured to perform the following:

receiving, from a user, an instruction to modify the annotations; and modifying the cluster annotation template based upon the instruction.

12. The system of claim 10, wherein the hardware processor is further configured to perform the following:

generating field extraction models for each of the first and second plurality of clusters using the cluster templates and cluster annotation templates.

13. The system of claim 9, wherein the automated visual analysis includes:

generating an image hash for each of the plurality of training files, and extracting structural information for each of the plurality of training files.

14. The system of claim 13, wherein the image hash includes generating a shingle.

15. The system of claim 9, wherein the automated contextual analysis includes generating a Term Frequency-Inverse Document Frequency vector for each of the plurality of training files.

16. The system of claim 9, wherein the hardware processor is further configured to perform the following:

receiving a document for data extraction;

identifying a classification of the document;

selecting a field extraction model based upon the classification; and extracting data from the document using the field extraction model.

17. A computer program product, comprising:

a computer readable storage medium having stored therein program code for generating cluster templates used for creating extraction models, the program code, which when executed by a computer hardware system, cause the computer hardware system to perform:

receiving a plurality of training files associated with a selected class;

performing an automated visual analysis on each of the plurality of training files;

performing an automated contextual analysis on each of the plurality of training files;

performing a first clustering of the plurality of training files into a first plurality of clusters using results from the automated visual analysis;

performing a second clustering of one of the first plurality of clusters into a second plurality of clusters using results from the automated contextual analysis; and generating the cluster templates for the first and second plurality of clusters, wherein the first and the second plurality of clusters are clusters of the plurality of training files.

18. The computer program product of claim 17, wherein the computer hardware system is further configured to perform the following:

receiving, for a first training file within a particular one of the first and second plurality of clusters, annotations;

automatically propagating the annotations to each of a plurality of other training files within the particular one of the first and second plurality of clusters;

generating a cluster annotation template for the particular one of the first and second plurality of clusters using the annotations;

receiving, from a user, an instruction to modify the annotations;

modifying the cluster annotation template based upon the instruction; and generating field extraction models for each of the first and second plurality of clusters using the cluster templates and cluster annotation templates.

19. The computer program product of claim 17, wherein the automated visual analysis includes:

generating an image hash for each of the plurality of training files, and extracting structural information for each of the plurality of training files, the image hash includes generating a shingle, and the automated contextual analysis includes generating a Term Frequency-Inverse Document Frequency vector for each of the plurality of training files.

20. The computer program product of claim 17, wherein the program code further causes the computer hardware system to perform:

receiving a document for data extraction;

identifying a classification of the document;

selecting a field extraction model based upon the classification; and extracting data from the document using the field extraction model.

* * * * *